Oct. 4, 1932.  H. G. DAVIS  1,880,858
METHOD AND APPARATUS FOR FORMING ARTICLES
Filed Sept. 22, 1927   9 Sheets-Sheet 4
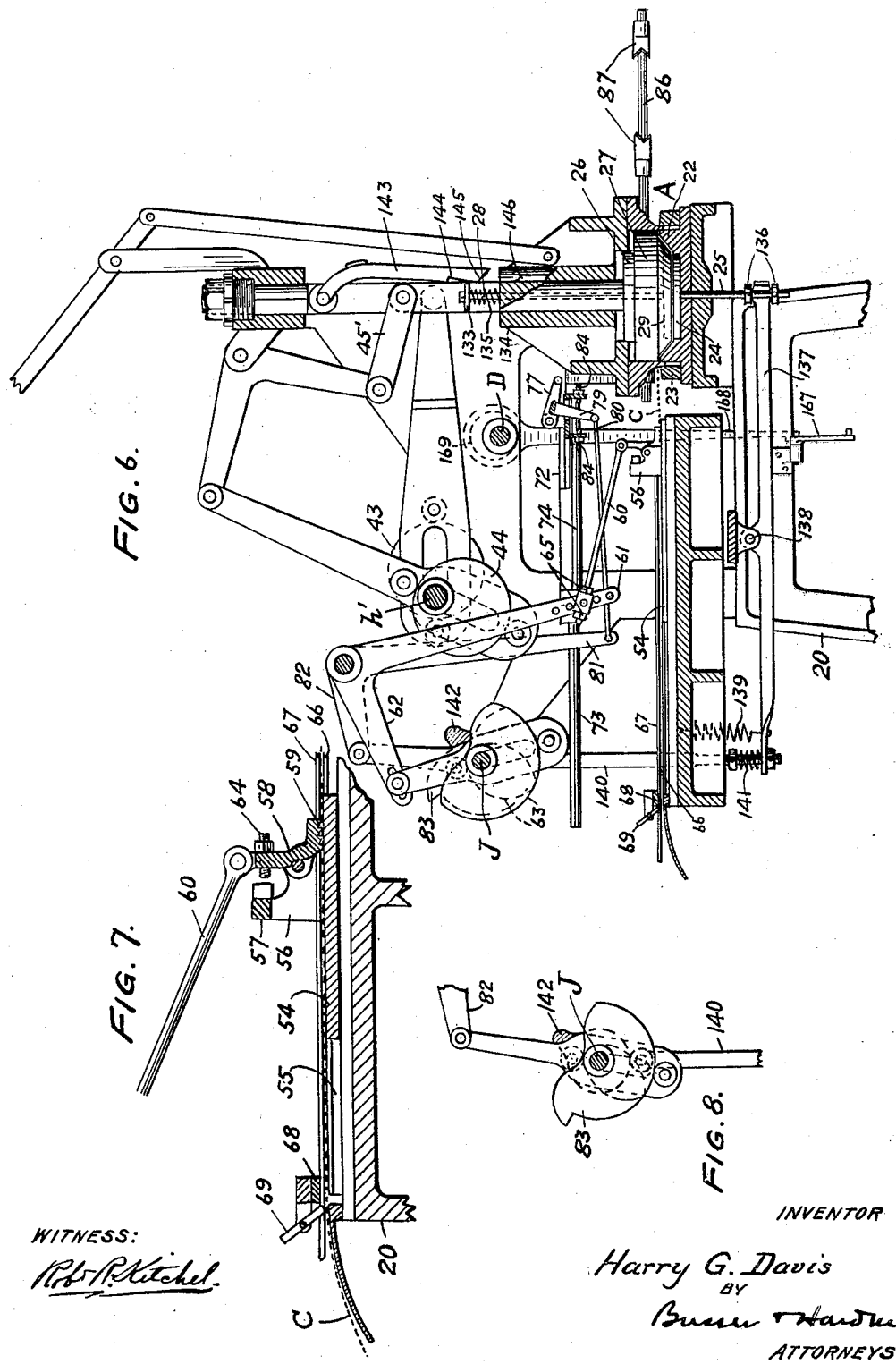
WITNESS:
Robt R Kitchel
INVENTOR
Harry G. Davis
BY
Burse & Harding
ATTORNEYS.

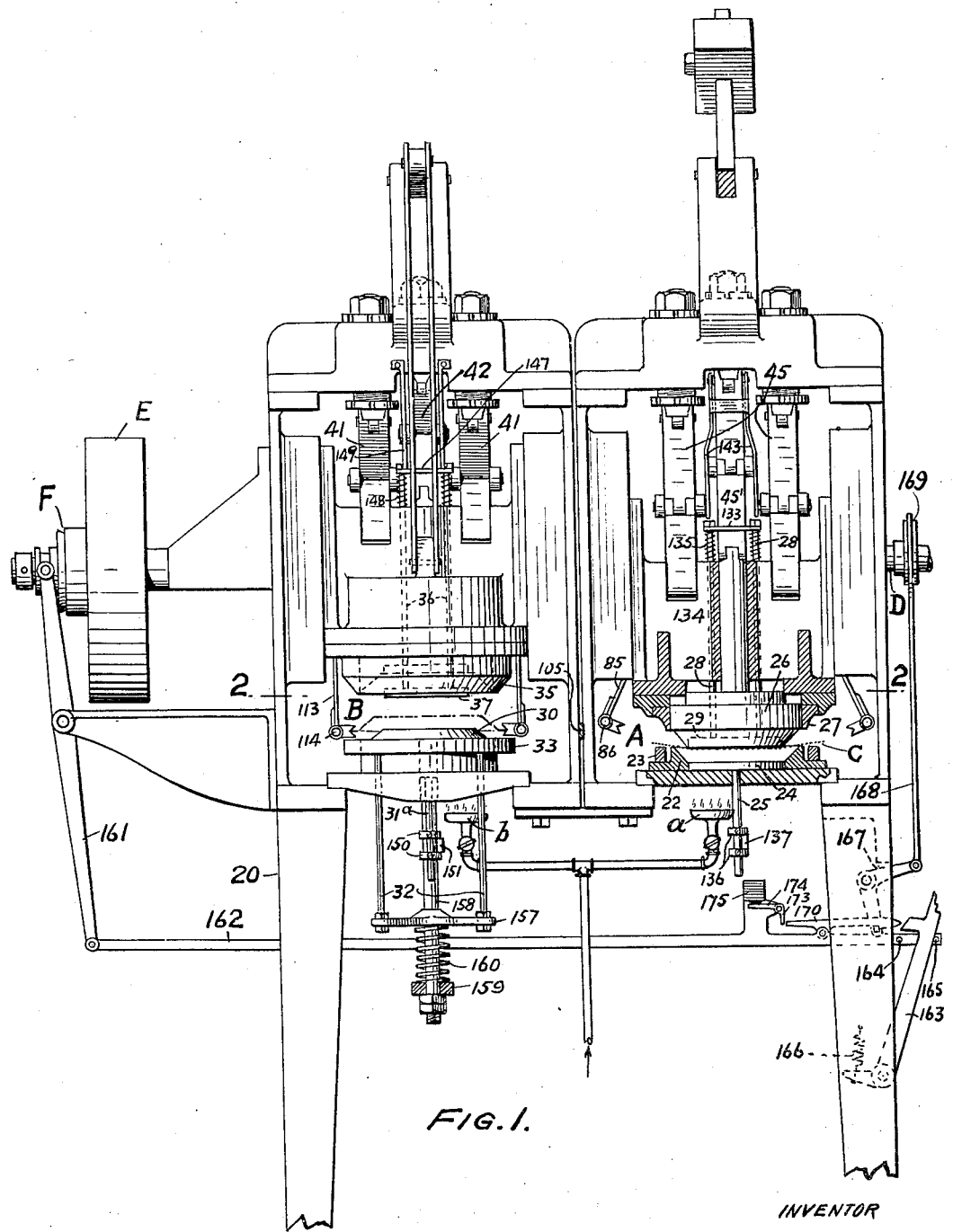

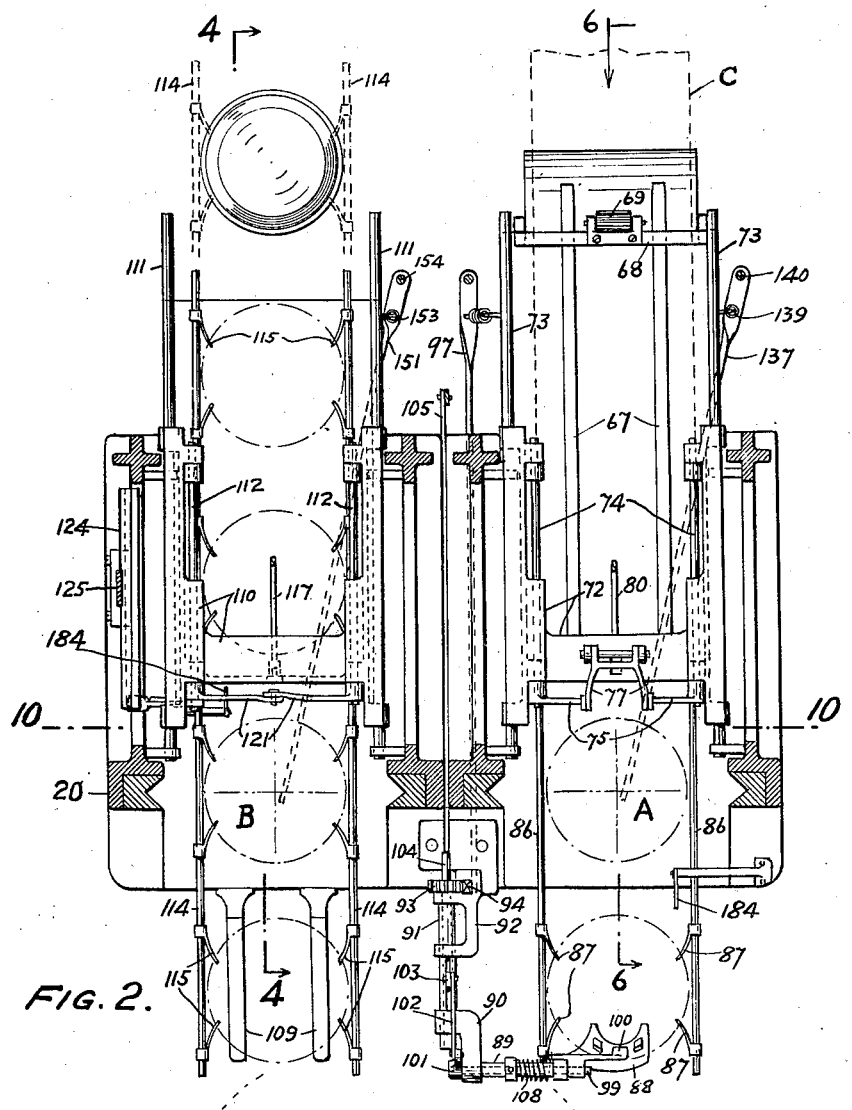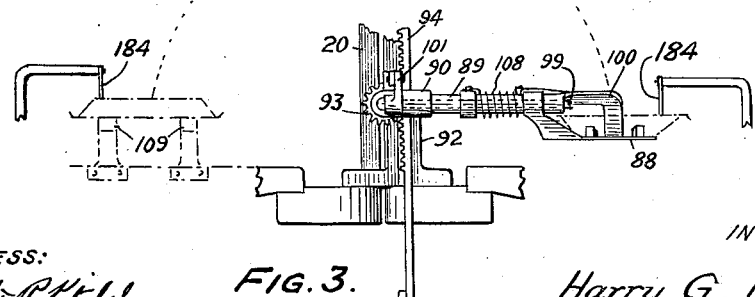

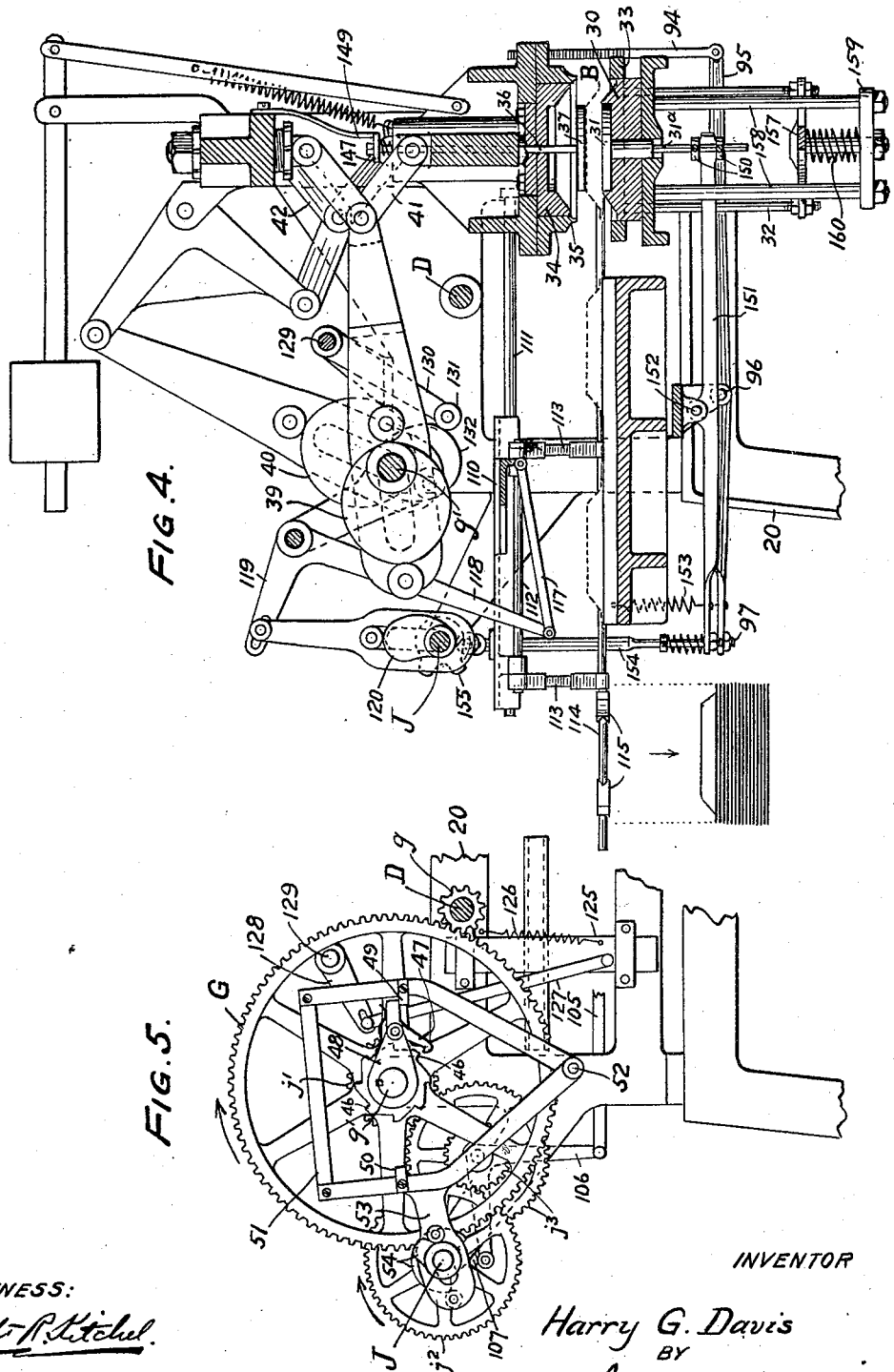

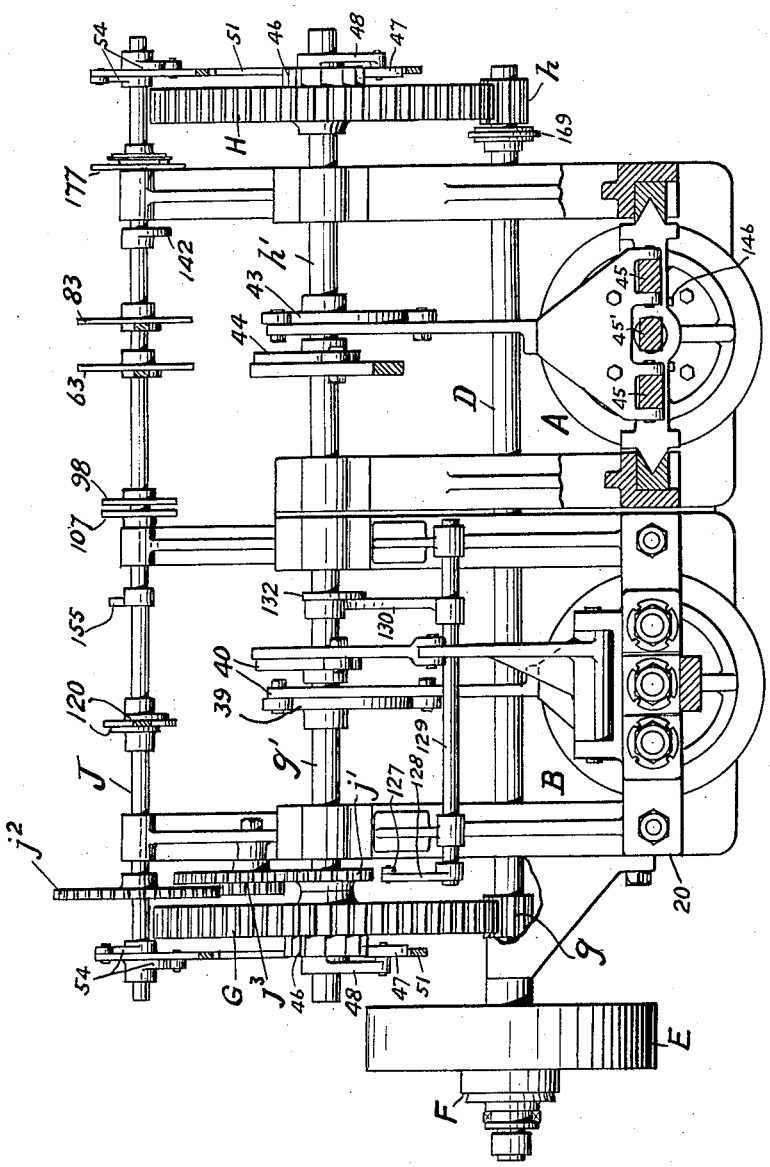

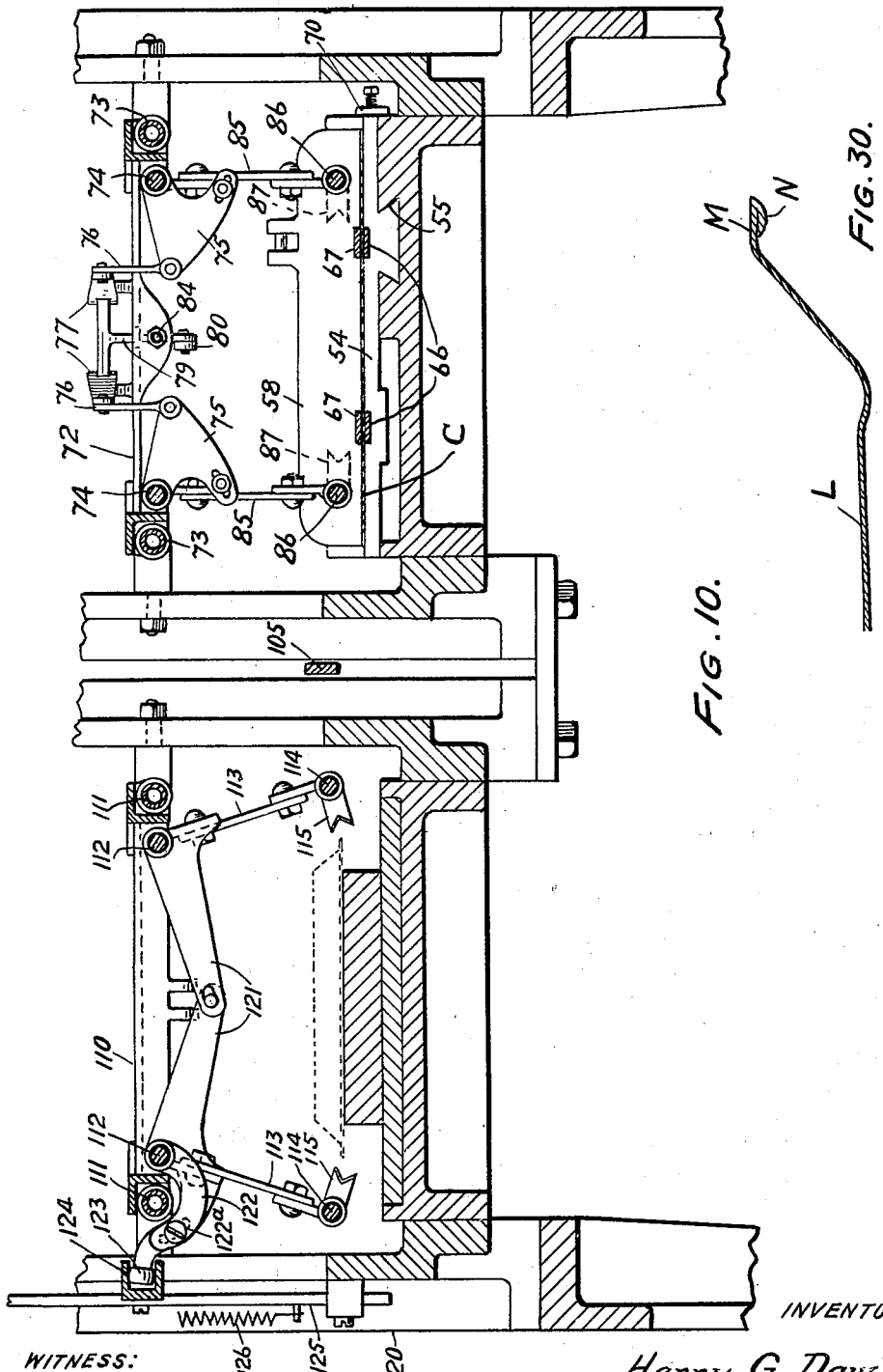

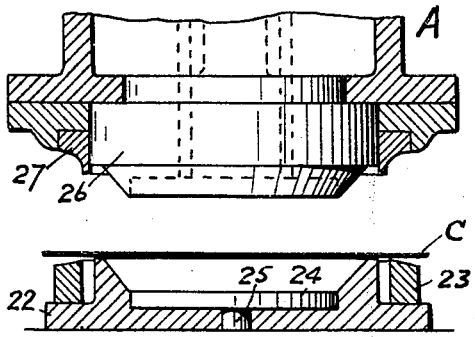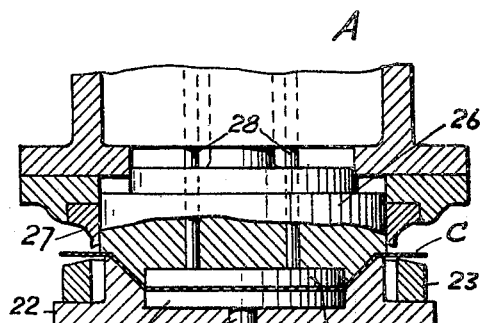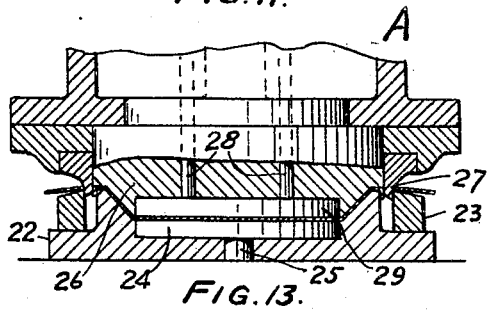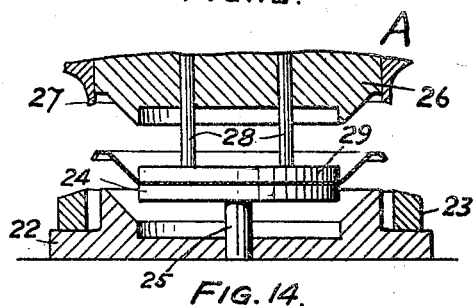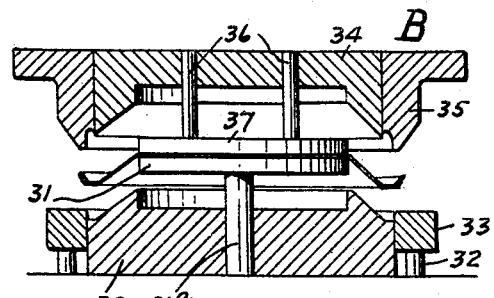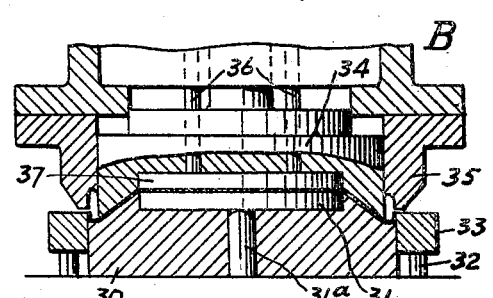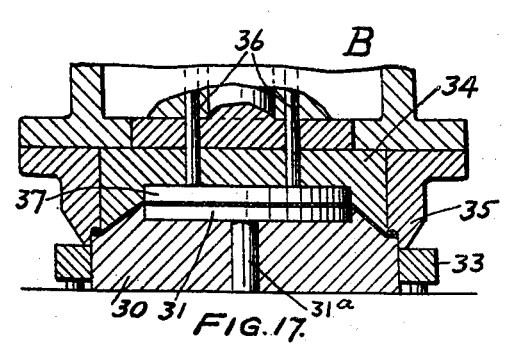

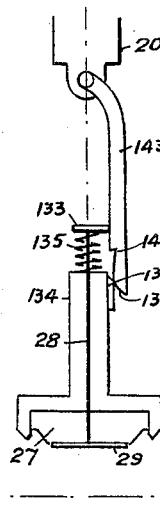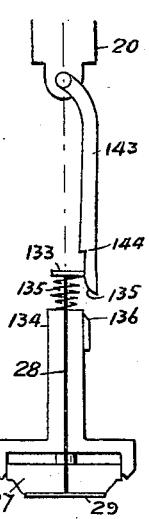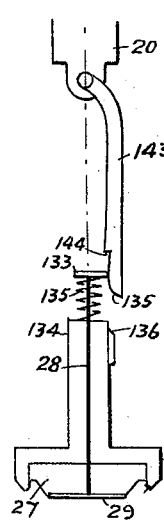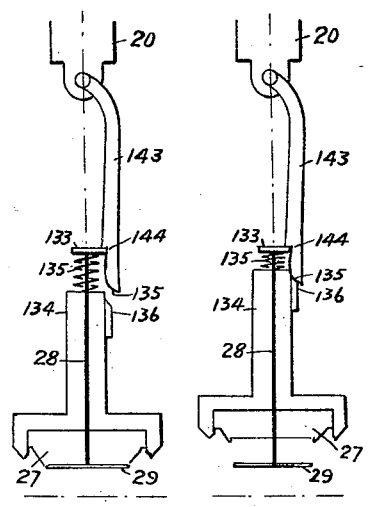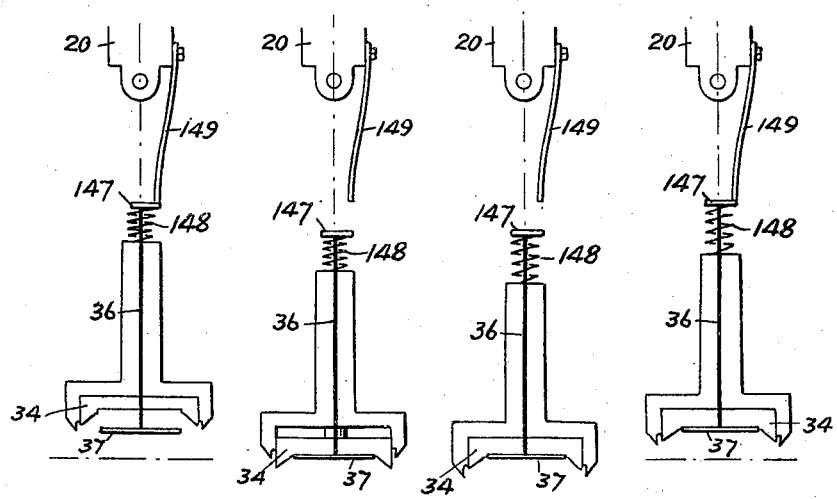

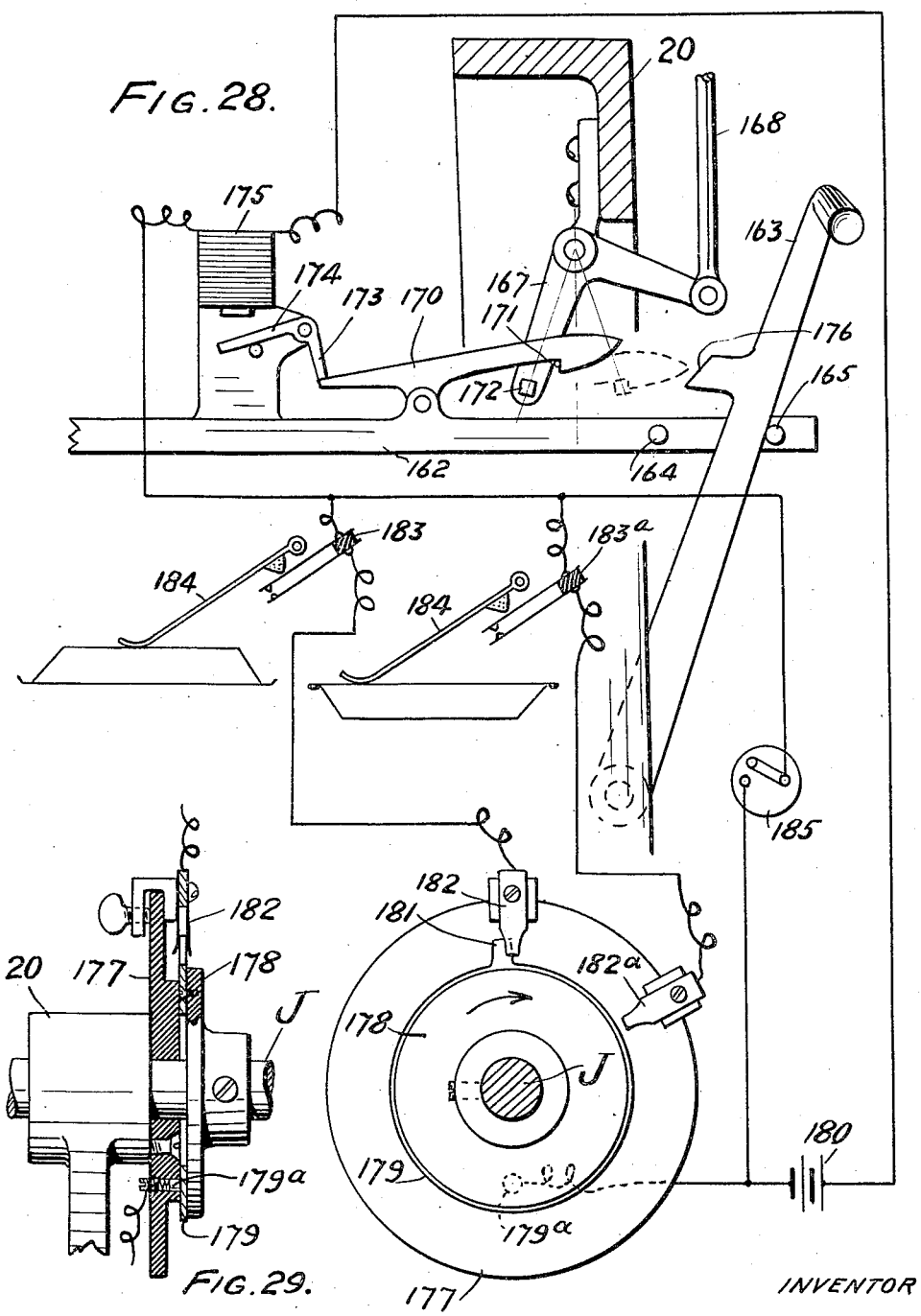

Patented Oct. 4, 1932

1,880,858

UNITED STATES PATENT OFFICE

HARRY G. DAVIS, OF PHILADELPHIA, PENNSYLVANIA, ASSIGNOR, BY MESNE ASSIGNMENTS, TO PURITY FIBRE PRODUCTS CORP., OF PHILADELPHIA, PENNSYLVANIA, A CORPORATION OF PENNSYLVANIA

METHOD AND APPARATUS FOR FORMING ARTICLES

Application filed September 22, 1927. Serial No. 221,260.

This invention relates to a method and apparatus for forming articles in dies, and heat treating the same while in the dies, and more specifically relates to a method and apparatus for forming pie plates, such as disclosed in the application of Otto Herting, Ser. No. 158,521, filed Jan. 3, 1927, from fibrous material as craft board and the like.

One of the objects of my invention is to provide a method and apparatus for blanking and partially forming articles from a continuous strip of chemically treated fibre board and during the partial forming of the article heat treating the same in forming dies, removing the articles from one set of dies, transferring the same to a second or finishing set of dies and subjecting the articles to a second heat treatment in the finishing dies.

Another object of my invention is to provide timing mechanism which is arranged to retain the articles in each of the dies a predetermined period of time in order to uniformly heat treat the articles, and between the steps of heat treatment to skin dry the articles by moving them through the atmosphere.

A further object of my invention is to provide automatically actuated devices for feeding the strip material to the cutting and partial forming dies together with transfer devices for transferring the partially formed articles from the first dies to the second or finishing dies and for transferring the finished articles from the finishing dies to a suitable receiver.

A still further object of my invention is to provide automatic stop devices which are arranged to stop the machine, if for any reason an article is not removed from either of the dies at a predetermined time during the operation.

Another object of my invention is to so arrange the timing mechanism that the die actuating mechanisms for the two sets of dies alternate with each other so that the power required from the power shaft is no greater for actuating the two sets of dies than would be required for actuating one die, and at the same time that the articles will be exposed to atmospheric treatment for the proper length of time during the transfer from the first set of dies to the second set of dies.

The machine comprises two sets of dies, the first set being heated and having means for preforming an article by pressure and for then cutting the partially formed article from a continuous strip of moistened or chemically treated fibre board which is intermittently fed to the dies, the partially formed article being retained within the first set of dies a predetermined length of time for partially curing the same by means of heat treatment. The partially formed article is then removed by means of suitable transfer devices from the first set of dies, turned over and transferred to the second set of dies which are heated.

The article is again subjected to pressure between the die members of the second set of dies and is subjected to a second heat treatment therein. The article in its transfer from the first set of dies to the second set of dies is subjected to the atmosphere which assists in the proper curing of the article. In the drawings:

Fig. 1 is a front view of the machine partly in section.

Fig. 2 is a sectional plan view taken on line 2—2, Fig. 1, showing particularly the gripper and transfer mechanisms.

Fig. 3 is a front view of the transfer mechanism shown in Fig. 2 showing the inversion of the plate in broken lines.

Fig. 4 is a general sectional view through the finishing side of the machine, taken on line 4—4 of Fig. 2.

Fig. 5 is a partial end view of the machine partially in section, showing the means for driving the various shafts from the main shaft.

Fig. 6 is a sectional view through the paper-feed side of the machine, taken on line 6—6 of Fig. 2.

Fig. 7 is a detail sectional view of the paper-feed mechanism.

Fig. 8 is a detail view showing several of the cams.

Fig. 9 is a general plan view of the machine partly broken away for clearness.

Fig. 10 is an enlarged sectional view taken on line 10—10 of Fig. 2, showing the gripper mechanisms.

Figs. 11 to 14 are four detail views somewhat diagrammatic showing the steps in the action of the dies for cutting the blank and giving first pressing.

Figs. 15 to 18 are four similar views showing the steps in the action of the dies for giving the final pressing.

Figs. 19 to 23 are five diagrams showing the action of the upper expeller associated with the first set of dies.

Figs. 24 to 27 are four diagrams showing the action of the upper expeller associated with the second set of dies.

Fig. 28 is a diagram of the electric stop mechanism.

Fig. 29 is a side view, partly in section, of the timing discs shown in Fig. 28; and Fig. 30 is a sectional view on an enlarged scale of a portion of a plate such as formed by my apparatus.

In the drawings the reference character 20 designates the frame of the machine on which is supported the lower or stationary members of the two sets of dies A and B, the die members of the set A being arranged to preform the article by a pressing operation, heat treat it and cut it from the strip of fibre board, while the die members of the set B are arranged to finish the forming and heat treating operation.

The die members of the set A are more clearly illustrated in detail in Figs. 11 to 14 of the drawings while the die members of the set B are clearly illustrated in Figs. 15 to 18 of the drawings.

The dies in the drawings illustrated are specifically arranged for forming pie plates such as described in the application to Herting above set forth.

Each set of dies comprises a fixed bottom member which is mounted on the frame of the machine and which is heated by means of a gas burner or other suitable heating medium, as shown in Fig. 1. The set A being heated by the burner $a$, while the set B is heated by the burner $b$.

Referring more particularly to Figs. 11 to 14 the first set of dies A, comprises a bottom member 22 which is fixedly mounted on the frame of the machine and is provided with an upwardly extending flange forming a tapered seat in said die member. Surrounding the flange on the member 22 and spaced therefrom is an annular shear member 23 the upper inner edge of which is arranged to cooperate with a shear member on the movable elements of this set of dies as hereinafter described, and mounted for movement within the member 22 is a plate holding and ejecting member or expeller 24 connected to a stem 25 which extends below the die members and is actuated as hereinafter described.

The movable elements of the set of dies A comprises a forming plunger 26, a shear member 27 which cooperates with the shear member 23, both the plunger and shear member being arranged to move relative to the lower die members and be actuated by means of separate toggle mechanisms hereinafter described. Mounted within the forming plunger 26 on suitable rods 28 is a second holding and ejecting member or expeller 29 which cooperates with the holding and ejecting member 24, for holding the plate between the die members in a proper position to be grasped by transfer mechanism for transferring the partially formed plate from the first set of dies A to the second set of dies B.

The second set of dies B shown in Figs. 15 to 18 comprises a fixed plunger 30 mounted on the bed of the machine, an ejector and holding member or expeller 31 arranged to be seated in a cavity therein, and connected to a stem 31a extending downwardly through the plunger. Surrounding the plunger and maintained in its elevated position by means of springs on guide rods 32, which extend below the machine, is an edge forming member 33. Mounted for movement on the plunger of the machine is a movable die member 34, and a movable edge curler 35, which are actuated by separate toggle mechanisms hereinafter described.

Mounted on rods 36, which extend upwardly through the movable die member 34, is an upper holding and ejecting member or expeller 37 which is arranged to be seated in a cavity in the movable die member 34 when the plate is being pressed between the die members of the set B.

In the forming of a plate with the two sets of dies the various parts above described are actuated in the following manner:

A strip of material C is fed between the upper and lower die members of the set A, as shown in Fig. 11, the mechanism is then actuated to first move the forming plunger 26 downwardly to press the strip into the lower die member as shown in Fig. 12. Immediately after the plunger 26 has been moved downwardly as shown in Fig. 12, the shear member 27 is moved downwardly to cut the plate from the strip C, as shown in Fig. 13, and the parts are held in this position a sufficient length of time to subject the plate to the preliminary heat treatment while under pressure between the die members.

The upper die member is then raised to its full height, while the upper and lower holding and ejecting members retain the plate between them and are raised to a position intermediate the upper and lower die members as clearly shown in Fig. 14, to retain the partially formed plate in a rigid position clear of the die members. Immediately after the parts have been moved to the position shown in Fig. 14 transfer mechanism, as hereinafter described, engages the edges of the plate to transfer the same to the set of dies B, and immediately after the plate is grasped by the transfer mechanism, hereinafter described, the upper holding and ejecting member 29 is elevated into the recess in the forming plunger 26, so that the plate is free to be removed from between the die members.

The partially formed plate is inverted or turned over before delivery to the second set of dies B, as shown in Fig. 15, and during such transfer from one set of dies to the other set, the plate is subjected to an atmospheric treatment which materially assists in the curing process. When the plate is delivered to said dies the holding and ejecting member 31 is seated in its recess in the plunger 30. Immediately after the plate has been transferred to the dies B, the lower holding and ejecting member 31 is elevated to grip the plate against the member 37 and hold it in a centered position. After the plate has been centered the movable die member 34 is moved downwardly together with the holding and ejecting members 30 and 31 to the position shown in Fig. 17, and the parts are retained in this position a sufficient length of time for heat treating the plate between the die members.

The upper members 34 and 35 of the set of dies B together with the holding and ejecting members are then elevated to the position shown in Fig. 18, and immediately after the parts have been moved to this position the transfer devices are moved into position to grasp the plate as shown, after which the lower holding and ejecting member 31 is removed to clear the plate before the transfer mechanism shifts the plate to a position beyond the die members.

The edge former 35 of the set of dies B is arranged to turn under and subject to pressure the edge portion N of the flange M on plate L, as shown in Fig. 30. The turning under and pressure of the edge portion N provides a sharp edge M' and rounds the portion N away from the edge and presses it up against the underside of flange M, the upper side of which presents a flat surface. The formation of the edge of the plate as described insures uniform accuracy of size of the plates produced and enables their use in machinery such as is used for the trimming of pie crusts and which requires uniform accuracy in the edge of the plates.

Mounted for rotation in the frame of the machine is a main power shaft D having a driving pulley E loosely mounted thereon and which is arranged to be connected to the shaft D by means of a friction clutch F.

Fixedly connected to the power shaft D are pinions $g$ and $h$ which mesh respectively with gear wheels G and H loosely mounted on short shafts $g'$ and $h'$ journaled in the frame of the machine. The shaft $g'$ carries cams 39 and 40 for actuating the toggle mechanisms 41 and 42 respectively which are connected by suitable lever mechanisms, to the edge former 35 and the movable die member 34, respectively, of the second set of dies B.

The shaft $h'$ carries cams 43 and 44 which are connected by suitable lever mechanisms with the respective toggle mechanisms 45 and 45' which are connected to a shear member 27 and plunger member 26, respectively, of the first set of die members A.

Mounted for rotation in the frame of the machine is a timing shaft J which is driven in a continuous manner from the large gear G by means of a pinion $j'$ connected to the gear G, a gear wheel $j^2$ connected to shaft J and intermediate gears $j^3$. The gearing is so arranged that when the clutch F is connected to the pulley E the shaft D will be driven in a continuous manner, together with gear wheels G and H and the shaft J, the shaft J making one revolution for each four revolutions of the gear G. As the gears G and H are loosely mounted on the shafts $g'$ and $h'$, said shafts are not actuated directly by means of the gears G and H, but are connected thereto by means of clutch mechanism controlled from the timing shaft in such a manner that each of said shafts $g'$ and $h'$ makes one-half revolution, when connected to their respective gear wheels G and H. By this arrangement the toggle mechanisms for actuating the dies are controlled from the timing shaft J.

As the actuating mechanisms for the shafts $g'$ and $h'$ are the same only one of said mechanisms will be described, namely the one in connection with the shaft $g'$. The hub of gear wheel G is provided with two or more clutch projections 46, which are arranged to be engaged by a pivoted dog 47, mounted on an arm 48 keyed to the shaft $g'$. This dog 47 has a laterally extending projection which is engaged by stops 49 and 50 on a swinging frame 51, pivoted to the frame of the machine at 52. Connected to this frame and extending laterally therefrom is an arm 53 which is actuated by cams 54 on the left hand end of shaft J, as viewed in Fig. 9.

By referring to Fig. 5 it will be seen that the frame 51 is in its left hand position and the projecting arm of the dog 47 is in engagement with stop 49 on the frame which retains the dog out of the path of movement of the clutch stops 46 on the gear wheel G. At the proper time the frame 51 will be moved to the right by means of the cams 54, release the dog 47 and permits its spring 53 to move the dog 47 into the plane of movement of the clutch projections 46. On engagement of the dog with one of the projections 46, the shaft $g'$ will be rotated 180° until the projection 48 strikes the stop member 50 on the frame 51 which has been moved into the plane of movement thereof, and which will retain it in this position until the frame 51 is again moved to the position shown in the drawings by cams 54.

The mechanisms for actuating the frame 51 at the opposite end of the machine are so timed with relation to each other and with the toggle mechanisms of the two sets of dies A and B, that said dies are opened and closed alternately.

The continuous strip of fibre board C is fed to the machine by means of mechanism clearly illustrated in Figs. 6 and 7 of the drawings, and comprises a slide 54 mounted for reciprocation in a guideway 55 in the frame of the machine. Connected to each side of the slide 54 is a bracket 56, which brackets are connected to each other by a cross bar 57. Pivotally connected to the brackets 56 is a lever 58 one arm of which is provided with teeth 59 arranged to engage the strip C and force it into contact with the slide 54, and fixedly clamp it between the slide and this arm of the lever 58. Connected to another arm of the lever 58 is a link 60, the other end of which is adjustably connected to one arm of a bell crank 61. The other arm 62 of this bell crank is actuated by cams 63 on the shaft J. The arrangement of the parts is such that when the slide is retracted or moved to the left, see Fig. 6, the slide will be moved relatively to the strip C but in the forward movement to the right, the lever 58 will be moved to first clamp strip C between it and the slide 54 and then feed the strip forwardly between the die members of set A.

Connected to the lever 58 is an adjusting screw 64 arranged to vary the lost motion of the lever 58. The end of the link 60 which is pivotally connected to the arm 61 of the bell crank is provided with nuts 65 for further adjustment. The arm 61 is provided with a plurality of openings to which the link 60 can be connected for varying the feed for forming plates of different sizes.

The strip C is fed forwardly between a lower set of guide bars 66 and an upper set of similar bars 67, which are connected to the frame of the machine. The slide 54 is cut away for the reception of the bars 66, while the lever 58 is similarly recessed for the reception of bars 67. The rear ends of the upper bars 67 are connected to a cross frame 68, on which is pivotally supported a dog 69 which is arranged to prevent retrograde movement of the strip C on the return movement of the slide 54. Connected to the slide 54 at one side thereof is an adjustable spring clamp 70 arranged for varying the gripping pressure on the strip C between the lever 58 and the slide. The arrangement being such that the greater the frictional engagement between the clamp 70 and the bed plate, the greater the pressure exerted on the strip before the slide 54 is actuated. Connected to the bed plate at the ingoing end of the strip C are suitable guides not shown which are adapted to be adjusted for strip material of varying widths, as the machine has been designed to form plates of varying sizes.

In the mechanism shown, the throw of the slide 54 may be varied by changing the connection of one end of the link 60 to provide five different lengths of feed, while a finer adjustment for slightly varying the throw may be made by adjusting the screw 64 to vary the amount of lost motion of the lever 58.

The partially formed plate is removed from the first set of dies A by means of mechanism clearly shown in Figs. 2, 6 and 10.

The plate removing mechanism for the set of dies A, comprises a frame 72 which is arranged to reciprocate on guide rods 73 supported on brackets connected to the frame of the machine. Mounted for oscillation in the frame 72 are two rods 74, and connected to each of these rods is a bell crank lever 75. Connected to these bell crank levers 75 are links 76 connected to arms 77 pivotally mounted on brackets on the sliding frame 72. Extending downwardly from the arms 77 is a crank arm 79 which is connected by means of a link 80 to an arm 81 of a bell crank, the other arm 82 of this bell crank being connected to be actuated by means of a cam 83 on the shaft J.

The crank arm 79 is arranged to have a predetermined amount of lost motion between the adjustable stops 84 on the reciprocating frame 72, for the purpose hereinafter described.

Loosely mounted on the oscillating rods 74 are adjustable levers 85, to the lower end of each of which is connected a gripper arm rod 86, the levers 85 being arranged to be adjusted for varying the distance between rods 74 and 86. Connected to each rod 86 and arranged for adjustment thereon are two gripper fingers 87, see Fig. 2. The levers 85 are adjustably connected by means of a slot and screw connection with the bell cranks 75, so that the movement of the gripper fingers 87 toward the plate within the dies may be adjusted, for gripping various sized plates.

In the operation of this portion of the mechanism the grippers in their return movement from the position shown in Fig. 2 to that about the center of the die members A, are moved to their open position by the pull on the link 80 in the return movement of the slide. Immediately after the die mechanism has been opened to position the plate as shown in Fig. 14, the cams 83 are arranged to push link 80 to close the gripping fingers 87 about the plate. Immediately after the plate has been grasped the holding and ejecting member 29 in the die A is elevated as hereinafter described, and the gripped plate is moved forwardly from between the dies into a turn-over device shown in Figs. 2 and 3 and when the plate has been gripped by the turn-over device, the cams 83 will move the parts to the position shown in Fig. 6 to open the gripping fingers 87 to clear the partially formed plate.

The turn-over mechanism comprises a base plate 88 to which the partially formed plate is moved by the grippers 87, and which is carried on the end of a tube 89. This tube 89 is connected to a fitting 90 which is connected to a second tube 91 extending at right angles to the first tube and journaled in bracket 92 on the frame of the machine. Connected to the opposite end of this tube 91 is a gear wheel 93 which is in engagement with a vertically movable rack 94. The lower end of the rack 94 is connected to the end of a lever 95 pivoted to the frame of the machine at 96, while the other end of said lever 95 as seen in Figs. 4 and 9, is connected to a rod 97 which is reciprocated by cams 98 on the shaft J. Mounted for oscillation within the tube 89 is a rod 99, to the outer end of which is connected a plate gripping finger 100, the other end of the rod 99 carrying a crank 101, which is connected by means of a link 102 to a projection 103 extending upwardly through a slot in tube 91 from a reciprocating rod 104, see Figs. 2 and 3. The end of rod 104 which not only reciprocates but is also rotated or oscillated with the tube 91 is engaged by a sliding rod 105, suitably guided in guides on the frame of the machine, and is arranged to be reciprocated by a bell crank lever 106, see Fig. 5, actuated by a cam 107, on the shaft J.

When the plate is fed to the turn-over device 98 by the gripper fingers 87, the finger 100 is elevated from the position shown in Fig. 3, and immediately after the plate has been delivered to this position and before the gripper fingers 87 release the plate, the push rod 105 is released by the cam 107, and a spring 108 surrounding sleeve 89 will force the finger 100 into contact with the plate, so that the plate will be held by the finger 100 and the base plate 88 of the turn-over. Immediately after the plate is gripped by the turn-over it is released from the fingers 87, and immediately thereafter the rack 94 will be elevated and turn the plate over onto a platform formed of fingers 109. The plate is transferred from this platform to the finishing dies B, illustrated in Figs. 15 to 18 inclusive, by means of transfer mechanism which I will now describe.

The transfer mechanism for transferring a plate from platform 109 to the finishing dies, and from the finishing dies to the point of delivery or where they are stacked, is clearly shown in Figs. 2, 4, 9 and 10.

This transfer mechanism comprises a frame 110 which is arranged to be reciprocated on guide rods 111 supported in brackets which extend laterally from the frame of the machine. Pivotally mounted in the frame 110 are two rock shafts 112, to each of which is connected a plurality of adjustable arms 113. To the lower end of each set is connected a rod 114. Connected to these rods 114 are four sets of gripper fingers 115, as clearly shown in Fig. 2. These gripper fingers are arranged so that one set of gripper fingers will pick up a plate from the platform 109, to place it between the dies, while a second set of fingers will engage a finished plate remove it from between the dies and deposit it in back of said dies, while a third set of fingers will remove a finished plate from the position in back of the dies to a second position in back of said dies, while the fourth set of fingers will remove a plate from the second position to a position where the plates are stacked in back of the machine, to the left of the point where the strip C is fed into the machine.

The frame 110 is reciprocated by means of a link 117 which is pivotally connected thereto at one end, the other end of the link is connected to one arm 118 of a bell crank, the other arm 119 of this bell crank is actuated by means of a slide element and a cam 120 on the shaft J. The throw of the cam 120 together with the various mechanisms is arranged to shift the plates from position to position as above described. The gripping fingers 115 are closed and opened by means of a pair of interconnected levers 121 which are connected to rods 112. Connected to one of the rods 112 is an adjustable lever 122 having a roller 123 on the end thereof which is arranged to be reciprocated in a channel track 124. This channel track 124 is fixedly mounted on a vertically reciprocating slide 125 mounted in guides on the frame of the machine, as clearly shown in Figs. 5 and 10. Connected to the slide 125 and the frame of the machine is a spring 126, which tends to maintain the track 124 in its elevated position. 127 is a link connected to the slide 125 and a crank arm 128 on a shaft 129, journaled in the frame of the machine. Connected to this shaft 129 is a lever 130 having a roller 131 thereon which is engaged by a cam 132 on shaft g, see Fig. 4. It will therefore be noted that when the track 124 is moved to its uppermost position by the cam 132 and the interconnecting mechanism, that the shafts 112 will be rocked to open the gripper fingers, as shown in Fig. 10, and when the roller 131 on the lever 130 is free to move toward the axis of the shaft g' through the medium of spring 126, the gripper fingers will be opened upon the four various plates. The lever 122 has an adjusting device 122$^a$ thereon, whereby the positions of the grippers 115 may be adjusted for various size plates.

The holding and ejecting members of the two sets of dies A and B are actuated by the following mechanisms:

The upper ejector 29 of the die A is provided with two rods 28 as previously described. These rods extend upwardly through the forming plunger 26 and are connected to each other by means of a cross plate 133, as clearly shown in Figs. 1 and 6. Interposed between the cross plate 133 and the top of a head 134 carrying the shear member 27 and surrounding each of the rods are springs 135 which tend to maintain the ejector 29 in its elevated position. The lower holding and ejecting member 24 in the set A of the dies has a downwardly extending rod 25, as heretofore described, to which are connected a plurality of collars 136, see Fig. 6, which engage one end of a lever 137 pivoted to the frame of the machine at 138. The other end of this lever 137 is provided with a spring 139 which tends to maintain the holding and ejecting plate 24 in its lowermost position. This latter end of lever 137 is also connected to a rod 140 by means of nuts and a spring 141 interposed between the upper nut and the lever. The rod 140 is moved downwardly by means of a cam 142 on the shaft J. Pivotally connected at its upper end to a fixed part of the machine is a double armed dog 143 which straddles the toggle mechanism 45' for actuating the dies of the set A. Each of the arms of the dog is provided with a detent 144 and a cam surface 145 on the lower end thereof. The arrangement is such that as the upper die member of the set A is elevated the two holding and ejecting members 24 and 29 will be moved upwardly with the plate by means of springs 135 and cam 142 which actuates rod 140, until the cross plate 133 engages the detent 144 which will arrest the upward movement of the holding and ejecting members during the further upward movement of the die member toward the position shown in Fig. 14. This position is clearly shown in Fig. 23 of the drawings. Immediately after this position is reached, the partially formed plate will be gripped by the gripping fingers 87, and immediately after the plate has been gripped a cam 146 on the upper die member at the end of its stroke will engage the cam 145, release the plate 133 and permit the spring 135 to move the holding and ejecting member 29 into the upper die member, as clearly shown in Figs. 11 and 19.

Figs. 19 to 23 clearly disclose the various movements of the holding and ejecting members for the upper die of the set A.

Figs. 24 to 27 inclusive disclose diagrammatically the means for actuating the holding and ejecting member 37 of the second set B of the forming dies, and comprise rods 36 connected to the member 27 and which pass through the upper forming die and are connected to each other at their upper ends by means of a cross plate 147 and surrounding each of the rods and interposed between the forming die and the cross plate 147 are springs 148. In the upward movement of the upper die member of the set B the upper cross plate 147 is arranged to engage a stop member 149, see Fig. 4 and Figs. 24 to 27, which will arrest the upward movement of the holding and ejecting member 27 after it has been raised to a predetermined point while the upper die members are permitted to rise above said point.

The ejecting and holding plate 31 is mounted in the lower die member or plunger 30 and is provided with a rod 31$^a$ as heretofore described, to which is connected a pair of collars 150, and between which collars projects one end of a lever 151 pivoted to the frame of the machine at 152. The other end of this rod 151 is connected to one end of a spring 153 which tends to maintain the ejecting and holding plate 30 in the lower die member. This last end of the lever 151 is also connected to a rod 154 in a manner similar to a rod 140 and which is actuated by a cam 155 on a shaft J.

The edge forming member 33 surrounding the lower die member of the set B is provided with four guide rods 32 which are connected to a spider 157. Extending downwardly from the bed plate of the machine are a plurality of rods 158, to the lower end of which is connected a spider 159 and interposed between the spiders 157 and 159 is a spring 160 which tends to maintain the edge forming member 33 in its elevated position, as shown in Figs. 4 and 15.

In order to prevent breaking of the dies by the insertion therein of a second plate, if for any reason the previously formed plate has not been ejected, I have provided an automatic stop mechanism which will stop the machine if a plate is not removed from either of the dies, which mechanism will now be described.

The timing mechanism which cooperates with the clutch F is shown on Figs. 1, 6, 9, 28 and 29.

One element of the clutch F is connected to one end of a lever 161, which is pivoted to the machine while the other end of said lever is pivotally connected to a slide rod 162 which is slidably mounted in guides in the frame of the machine. Pivotally mounted on the frame of the machine is a hand clutch actuating lever 163, arranged to engage pins 164 and 165 on the rod 162, whereby said rod may be shifted by means of the hand lever to throw one of the clutch elements into and out of engagement with the other clutch element.

166 is a relatively light spring connected to an arm of the lever 163, and is merely of sufficient strength to retain the lever 163 against the stop 165 but is not strong enough to shift the rod 162. The above mechanism merely describes the means for shifting the clutch by hand.

The automatic stop mechanism comprises both electrical and mechanical operating means which will now be described, and comprises a bell crank 167 pivotally connected to the frame of the machine, which is connected by means of a connecting rod 168 with an eccentric 169 on the main power shaft D, the ratio of the gearing being such that the main power shaft D is rotated 78 times for each rotation of the timing shaft J, so that the bell crank 167 is oscillated 78 times during the cycle of pressing a plate.

Mounted on the slide rod 162 is a pivoted lever 170, see Figs. 1 and 28, one end of said lever having a detent 171 in line of movement of a projection 172 on one arm of the bell crank 167, the arrangement being such that when the lever 170 is in the dotted line position shown in Fig. 28, the rod 162 will be moved to the right by the engagement of the projection 172 with the detent 171 and release the clutch.

The lever 170 is maintained in its full line position as shown in Fig. 28 when the machine is operated, and is maintained in such position by a locking lever 173 connected to an armature 174, which is pivotally mounted on a bracket on the rod 162. This armature is arranged to be attracted by an electromagnet 175 also carried by the rod 162. The armature 174 and locking projection 173 are so arranged that they will be held in the position shown in Fig. 28 by means of gravity.

In the normal operation of the machine, when running, the parts are in the position shown in Fig. 28, and if it is desired to stop the machine by hand, the hand lever 163 is moved to the right and its engagement with pin 165 will separate the clutch elements, and when it is again desired to start the machine, the lever 163 is moved to the left and contacts with the pin 164 which will shift the rod 162 to the left and move the clutch elements into engagement with each other, and when the hand lever is released the spring 166 will throw the lever to the position shown in Fig. 1.

Assuming the machine to be running and a plate should stick in either of the dies an electric circuit through the magnet 175 will be automatically closed as hereinafter described, which will energize magnet 175, raise the armature 174 and release lever 170, so that on the next movement of lever 167 the clutch members will be released and the machine will be brought to a stop. After the parts have been cleared the hand lever 163 is manipulated and a cam face 176 on the lever 163 will engage a cam face on lever 170, move it to the position shown in Fig. 28, and permit the latch lever 173 to engage it and retain it in its elevated position.

The electrical control mechanism for closing the circuit through the magnets 175 comprises a disc 177 of insulating material fixedly mounted to the frame of the machine and surrounds the timing shaft J as shown in Figs. 9 and 29. Connected to the shaft J and arranged to rotate therewith is a disc of nonconducting material 178, and connected to this disc of nonconducting material is a contact ring 179 of conducting material which is in electrical connection with a brush 179a connected to a source of electrical energy such as a battery 180. Extending radially from the conducting disc 178 is a narrow contact 181, which makes one complete cycle during the formation of a plate as the same is rotated by the timing shaft J. Adjustably connected to the nonconducting disc 177 are a plurality of brushes 182 and 182a. Brush 182 is in electrical connection with one pole of a jack 183, the other pole of said jack being connected to one pole of the source of electrical energy 180. Brush 182a is also connected to one pole of a jack 183a, the other pole of which is connected to the first mentioned pole of the electro-magnet 175.

Pivotally mounted adjacent to each of the dies at the exit side thereof is a lever 184, see Figs. 2 and 28, one of said levers being arranged to control the jack 183 and associated with dies A, while the other is arranged to control the jack 183a and associated with dies B. The levers 184 being arranged to fall by gravity when not engaged by a plate.

The timing arrangement is such that the contact 181 passes brushes 182 and 182a at the time the plates are removed from their respective dies A and B, and if a plate is removed from the dies the levers 184 will be elevated so that the circuit is not closed through the magnet 174. If for any reason a plate should stick in either of the dies, either one or the other of the levers 184 would remain in its lowered position when the contact 181 passes either brush 182 or 182a, depending on the die in which the plate stuck, close the circuit through the magnet which will operate the stop mechanism and throw the clutch.

185 is a hand switch which is shown in its open position and which is arranged to be closed by hand to close the circuit through the magnet 175 and stop the machine when desired.

As will be appreciated, the operation of the various mechanisms involved in the machine embodying my invention may be timed as may be desired. However, I have found that if the machine be timed by arrangement of the cams so that opening of the dies is effected in 1/8 of a revolution, the dies being permitted to remain open during another 1/8 of a revolution, closed during another 1/8 of a revolution and permitted to remain closed during 5/8 of a revolution, satisfactory results will be obtained. It will be noted that by such timing the opening and closing of the dies permitting entry and withdrawal of the blank or partially formed article is effected during 3/8 of a revolution of the cam shaft, while the dies remain closed during 5/8 of a revolution of the cam shaft, thus enabling a relatively long heat treatment of the articles to be effected. In the relative timing of the dies A and B, the cams controlling the die B are set, for example, 1/2 of a revolution of the cam shaft ahead of the cams controlling the operation of the die A.

It will be understood, as indicated, that the particular timing may be varied and that the above description is merely illustrative.

The advantage of my invention results from the provision of a method and apparatus for forming articles from a strip of chemically treated material, in which the articles are first pressed from the strip, the surplus material is then sheared from the pressed blank, the blank is maintained under pressure and heat treated for a predetermined time, after which it is exposed to the atmosphere, and again subjected to pressure and heat treatment for a predetermined period.

A further advantage of my invention results from the provision of means for automatically feeding the strip material in a step by step manner to forming and trimming dies, automatically removing the partially formed article from these dies, turning the article upside down and transferring it to a second set of forming dies, and automatically removing the finished articles from the second set of dies and delivering them to a receiving point.

A further advantage of my invention results from the provision of means for automatically controlling the time the articles are maintained under pressure and are given heat treatment.

A still further advantage results from the provision of means for automatically stopping the machine if a formed article is not removed from either of the dies, together with hand controlled means for stopping or starting the machine, which hand controlled means automatically sets the automatically controlled means when the machine is thrown into operation and which automatic means is maintained in operative position when the hand controlled means is actuated by hand.

A still further advantage results from the provision of a plate adapted for baking, and which is provided with a sharp edge on which the dough for forming the crust of the pie can readily be trimmed.

Having now fully described my invention what I claim and desire to protect by Letters Patent is:

1. A press for forming articles having two sets of dies side by side, means for feeding strip material to one set of dies, means for removing the article from said dies in the direction of the feed of the strip material, means for transferring the article in a lateral direction to a position in front of the second set of dies, means for transferring the article from the position in front of the second set of dies to the second set of dies, said last mentioned means also being arranged to remove a finished article from the second set of dies and move it toward the back of said dies, means for actuating the removing means and the two sets of transfer means, and means for actuating the dies in timed relation to the feeding, removing, and transfer means.

2. A press for forming pie plates from sheet stock having two sets of dies, means in the front set of dies for dishing the plates and forming an annular flange at the edge of the dished portion, shearing means associated with the first set of dies for shearing the surplus stock from the plates after dishing and for displacing a portion of the flange on the plates in a lateral direction after shearing, the second set of dies having means for repressing the dished portion and a portion of the flanges of the plates, and means on the second set of dies for curling the portions of the flanges displaced by the first set of dies.

3. A press for forming pie plates from sheet stock, having two sets of dies, means in the first set of dies for dishing the plates and forming an annular flange at the edge of the dished portion, shearing means associated with the first set of dies for shearing the surplus stock from the plates after dishing and for displacing a portion of the flanges on the plates in a lateral direction after shearing, means for actuating the first set of dies and for holding them in their closed position for a time period, means for actuating the shear members while said dies are closed, the second set of dies having means for repressing the dished portion and a portion of the flanges of the plates, and means on the second set of dies for curling the portions of the flanges displaced by the first set of dies.

4. A press for forming pie plates from sheet stock, having two sets of dies, means in the first set of dies for dishing the plates and forming an annular flange at the edge of the dished portion, shearing means associated with the first set of dies for shearing the surplus stock from the plates after dishing and for displacing a portion of the flanges on the plates in a lateral direction after shearing, means for actuating the first set of dies and for holding them in their closed position for a time period, means for actuating the shear members while said dies are closed, the second set of dies having means for repressing the dished portion and a portion of the flanges of the plates, means on the second set of dies for curling the portions of the flanges displaced by the first set of dies, means for closing the second set of dies and for maintaining them closed for a period of time, and means for actuating the curling means while said second dies are maintaining the plates under pressure.

5. A press for forming pie plates from sheet stock, having two sets of dies, means in the first set of dies for dishing the plates and forming an annular flange at the edge of the dished portion, shearing means associated with the first set of dies for shearing the surplus stock from the plates after dishing and for displacing a portion of the flanges on the plates in a lateral direction after shearing, means for actuating the first set of dies and for holding them in their closed position for a time period, means for actuating the shear members while said dies are closed, the second set of dies having means for repressing the dished portion and a portion of the flanges of the plates, means on the second set of dies for curling the portions of the flanges displaced by the first set of dies, means for closing the second set of dies and for maintaining them closed for a period of time, means for actuating the curling means while said second dies are maintaining the plates under pressure, transfer devices for transferring the preformed plates from the first set of dies to the second set of dies, transfer devices for removing the finished plates for the second set of dies, and means for actuating both transfer devices in timed relation to the means for actuating the dies and to each other.

6. Dies for forming and blanking an article from sheet stock comprising two die members movable relative to each other and two shear members movable relative to each other, means for moving the die members in advance of the shear members, means for moving the shear members after the die members have been moved to shape the article to remove the surplus stock from the sheet, holding and ejecting devices within the dies, means for actuating the holding and ejecting devices for positioning the shaped article at a point above the lower die member and below the upper die member, dies for finishing the shaped article comprising two die members movable relative to each other for forming the body of the article, an edge forming member cooperating with each of said last mentioned die members, one of said members being arranged to receive the edge when the die members are moved relative to each other, while the other member is arranged to be moved after the die members have been closed to move the first edge curling member and curl the edge.

7. Dies for forming and blanking an article from sheet stock comprising two die members movable relative to each other and two shear members movable relative to each other, means for moving the die members in advance of the shear members, means for moving the shear members after the die members have been moved to shape the article to remove the surplus stock from the article, holding and ejecting devices within the dies, means for actuating the holding and ejecting devices for positioning the shaped article at a point above the lower die member and below the upper die member, dies for finishing a preformed article comprising two die members movable relative to each other for forming the body of the article, an edge forming member cooperating with each of said die members, one of said members being arranged to receive the edge when the die members are moved relative to each other, while the other member is arranged to be moved after the die members have been closed to move the first edge curling member and curl the edge, and means within the die members for ejecting the finished article from the dies and holding it in a position between said dies and clear thereof.

8. A machine for forming pie plates from a continuous strip of material, comprising means for feeding the strip from the back to the front of the machine in a step by step movement, a set of cutting and preforming dies in the line of movement of said strip, means for actuating said dies, means within said dies for stripping the preformed article from the dies and holding it in a predetermined position between the dies, grippers for moving the preformed articles to the front of said dies, means for transferring said article from in front of said dies to a position in front of a second set of dies, means for transferring said article from the front of said second set of dies to a position between the dies, means for holding the plates between the dies before they are closed, means for closing and opening said dies, said holding means within the dies being arranged to strip the article from the second set of dies and holding it between said dies, and grippers for removing the finished plate from between said dies to a position in back of said dies.

9. A forming press having a die comprising a movable member and a fixed member, means for moving said first member, two movable means in the die members for clamping an article between them, means for moving the two clamping means, when the die members are separated, to a position intermediate the separated die members, and means for separating the two clamping means after the die members have been separated a predetermined distance.

10. A press for forming articles from sheet stock having two sets of pressing dies, a main power shaft, separate actuating means for each set of dies each including a shaft, means for connecting each of said shafts in driving relation with the power shaft, timing means driven from the power shaft, and control means connected to the timing means for alternately actuating the connecting means between the power shaft and each of the shafts of the die actuating means in a timed relation.

11. A press for forming articles from fibrous sheet material including means for supporting a blank of said sheet material having partially turned edge portions, said means forming a rigid backing for portions of the blank inwardly of the partially turned edge portions, and means movable relatively to said supporting means and having a cam surface arranged to engage the partially turned edge portions to turn them over the portions of the blank inwardly thereof and to press them thereagainst.

12. A press for forming articles from fibrous sheet material including means for supporting a blank of said sheet material having partially turned edge portions, said means forming a rigid backing for portions of the blank inwardly of the partially turned edge portions, and means movable relatively to said supporting means and having a cam surface arranged to engage the partially turned edge portions to turn them over the portions of the blank inwardly thereof and to press them thereagainst, said cam surface and backing means approaching each other during the application of the pressure to form a sharp edge for the finished article.

13. A press for forming articles from fibrous sheet material including means for supporting a blank of said sheet material having partially turned edge portions, said means forming a rigid backing for portions of the blank inwardly of the partially turned edge portions, means movable relatively to said supporting means and having a cam surface arranged to engage the partially turned edge portions to turn them over the portions of the blank inwardly thereof and to press them thereagainst, and means for presenting the partially turned edge portions for proper engagement by the cam surface.

14. A press for forming articles from fibrous sheet material including means for supporting a blank of said sheet material having partially turned edge portions, said means forming a rigid backing for portions of the blank inwardly of the partially turned edge portions, means movable relatively to said supporting means and having a cam surface arranged to engage the partially turned edge portions to turn them over the portions of the blank inwardly thereof and to press them thereagainst, and means for presenting the partially turned edge portions for proper engagement by the cam surface, said presenting means automatically withdrawing from operative position upon movement of the cam surface into engagement with the partially turned edge portions.

15. A press for forming articles from fibrous sheet material including means for distorting a portion of sheet material out of the plane of the sheet material, and means for severing the sheet material along a line spaced outwardly of the distorted portion and for bending the portions of the sheet material immediately inwardly of said line out of the plane of the sheet material to form partially turned edge portions, while maintaining an annular portion of material between the distorted portion and the partially turned edge portions in the plane of the sheet material.

16. A press for forming articles from fibrous sheet material including means for distorting a portion of sheet material out of the plane of the sheet material, means for severing the sheet material along a line spaced outwardly of the distorted portion and for bending the portions of the sheet material immediately inwardly of said line out of the plane of the sheet material to form partially turned edge portions, means forming a rigid backing for portions of the blank inwardly of the partially turned edge portions, and means movable relatively to said supporting means and having a cam surface arranged to engage the partially turned edge portions to turn them over the portions of the blank inwardly thereof and to press them thereagainst.

17. A machine for forming articles from sheet material including a set of dies for pressing the article into desired shape, means for removing the articles from the dies, circuit controlling means arranged to be operated by articles during their passage from the dies, operating mechanism for the dies, a second circuit controlling means operating in timed relationship with the operating mechanism, and electrically controlled devices actuated by failure of operation of the first circuit controlling means at a predetermined period in the operation of the second circuit controlling means to render the operating mechanism inoperative.

18. A machine for forming articles from sheet material including a set of dies for pressing the article into desired shape, means for removing the articles from the dies, circuit controlling means arranged to be opened by articles during their passage from the dies, operating mechanism for the dies, a second circuit controlling means arranged to be closed at predetermined intervals, and electrically controlled devices in series with the two circuit controlling means to render the operating mechanism inoperative if both circuit controlling means are simultaneously closed.

19. A machine for forming articles from sheet material including a set of dies for pressing the article into desired shape, means for removing the articles from the dies, operating mechanism for the dies, and electrically controlled devices for rendering the operating mechanism inoperative if an article is not removed from the dies at a predetermined time.

20. A machine for forming articles from sheet material including a set of dies for pressing the article into desired shape, means for removing the articles from the dies, operating mechanism for the dies, electrically controlled devices for rendering the operating mechanism inoperative if an article is not removed from the dies at a predetermined time, and manually operated means for restoring the operating mechanism into operative condition.

21. A machine for forming articles from sheet material including two sets of dies, devices for feeding the sheet material to the first set of dies, means for removing the partially formed articles laterally from the first set of dies, means for feeding the articles to the second set of dies, and means for taking the articles from the removing means, reversing them and presenting them to the feeding means, all of said parts being operated in timed relationship.

In testimony of which invention, I have hereunto set my hand, at Philadelphia, Pennsylvania, on this 17th day of September, 1927.

HARRY G. DAVIS.